Sept. 13, 1949. E. E. PENDLETON 2,481,946
RETAINER FOR SPECTACLES
Filed April 17, 1948

INVENTOR,
ELEANOR E. PENDLETON
BY Robert B. Terry
ATTORNEY.

UNITED STATES PATENT OFFICE 2,481,946

RETAINER FOR SPECTACLES

Eleanor E. Pendleton, St. Louis, Mo.

Application April 17, 1948, Serial No. 21,689

3 Claims. (Cl. 88—51)

This invention relates to improvements in retainers for spectacles, and more particularly to an improved device so equipped and of such proportions as to enable quick and easy removal or application of certain types of eye glasses, while providing for their retention between periods of active usage in a position such that they are secured against loss, do not interfere with wearing apparel, repose in a position comfortable to the user, and such that they are instantly available for reapplication when wanted.

Certain provisions have heretofore been employed for the retention of industrial goggles and similar devices in place during periods of their usage; also certain devices have been known for providing a flexible connection between the bow elements or temple pieces of spectacles. However, as far as is known, none of such devices is capable of application to eye glasses of usual and prevalent standard types without modification of the bows or temple elements, and possibly of other parts of the usual glasses. Moreover, such devices as have come to applicant's attention in either a position of use or of disuse of the spectacles, rather tightly grip or embrace some portion of the head of the wearer, resulting in discomfort. It is accordingly a principal object of the present invention to obviate the several objections to devices such as those referred to, and to provide a fully comfortable, attractive, inexpensive and serviceable attachment which enables the glasses to be kept captive in a position ready for application, between periods of their usage.

A further and important objective of the present invention is attained in an arrangement for the purpose noted which will yieldably grip the terminals of the bows or temples of prevalent types of spectacles, and which may be readily applied without tools or special skill, and without any modification of parts of the usual types of spectacles.

Still a further object of the present invention is realized in an improved resilient socket connection for spectacle bows, and a retainer band, this arrangement consisting in a preferred form, of an open end, rubber-like element of appreciable expansive resilience, and a rigid ferrule connecting the rubber-like element to each of the opposite ends of a captor band.

The foregoing and numerous other objects will more clearly appear from the following detailed description of a presently preferred embodiment of the invention, particularly when considered in connection with the accompanying drawing, in which.

Figure 1:
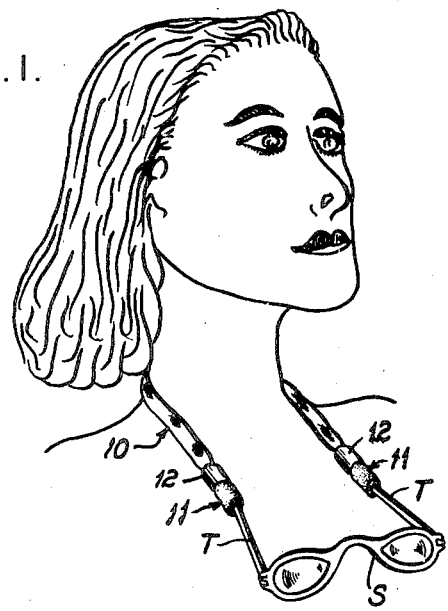
Fig. 1 is an isometric view showing the device attached to the temple elements of a pair of spectacles, and showing the manner in which the latter are kept captive in a position of their repose between periods of use, over the chest area of the wearer.
Figure 2:
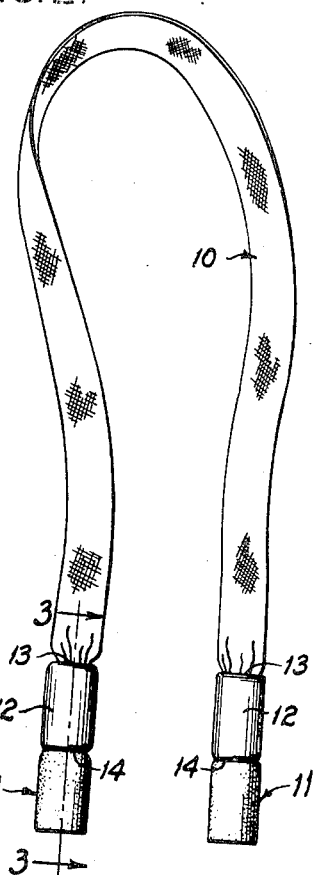
Fig. 2 is an enlarged elevational view of the device as detached.

Referring now by characters of reference to the drawing, it is seen from Fig. 1 that the pair of spectacles S reposing on the chest of the wearer, include as is usual, the pair of rearwardly extending temple pieces T. There are illustrated as an example, eye glasses of the type of spectacles, embodying the heavier plastic frames and temples; however, it should be distinctly understood that the device of the present invention is equally adapted to the reception of the usual wire frames of whatever prevalent style, including the wire-like temples and curved extremities sometimes designated in the trade as bows, the only difference in the retainer assembly for accommodation of these different types, being a somewhat smaller internal diameter of the socket elements, later to be described, for the reception of the smaller gauge, usually wire-terminels of the metal temples and bows.

The retainer device itself consists of a flexible tie element indicated generally at 10. This may be formed of a cord, an ornamental chain, or a band of textile material such as a ribbon, as is preferred. In the claims, where the term "ribbon" is used to define the tie element, it is understood that it includes equivalents such as these mentioned. In the latter case it will usually be of woven material, and may be supplied in any of a variety of colors to harmonize with the costume of the wearer. The band may if desired, consist of separate lengths, say of ribbon, and these lengths tied or fastened to enable an easy variation in effective length of band.

Secured to each end of the tie element such as band 10, as by means hereinafter to be described, is a flexible socket generally indicated at 11. Each such socket is conveniently formed of a short length of a rubber or rubber-like material by which designation it is intended to embrace many of the elastic synthetic products, plastics, etc. but which, in the present commercial form of the device, consists of a short length of pure gum surgical tubing.

As an attractive, permanent and effective attachment means, functioning to secure each of the socket structures 11 to the end region of the band 10, there is preferably employed an annulus of appreciable length, exemplified by ferrule 12. This may be formed of metal and attractively plated or otherwise coated, or may be formed of a suitable plastic or other material of such characteristics as to retain its rigidity and form. If desired, the ferrule may, to facilitate assembly, be formed of companion threaded elements. It is noted, as shown by the drawing and a matter of preference, that the opposite ends of the ferrule are substantially inturned or constricted in order better to serve the assembly purposes of this element. In the example shown and as preferred, the innermost end 13 of the ferrule is constricted to an extent that the opening through this end of the ferrule approximates only about half of the normal intermediate internal cross section of the ferrule, while the opposite or outermost end of the ferrule indicated at 14, is constricted but to a lesser extent, about an intermediate portion of the socket forming member 11. Thus that portion of the member 11 which is disposed within the ferrule, is held under some degree of compression therein. This fact, in coaction with the inturned margins in the region 14 of the ferrule, serves positively and permanently to retain the socket in assembly with the member 12.

Securement of the band, such as a flat ribbon of woven characteristic is effected by providing an overfold 15 as by rolling or folding the extreme end of the band 10 in this region. This end of the band is secured in its overfolded or rolled condition as by a metal staple or other suitable fastening 20.

Figure 3:
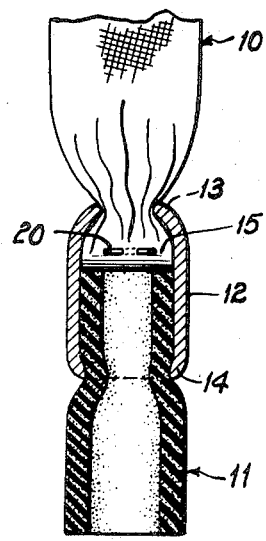
Fig. 3 is a further enlarged sectional elevation in a longitudinal plane through one of the sockets and ferrules at one end of the band, this view being taken along line 3—3 of Fig. 2.

It is suggested without restriction, but as a practical order of assembly of the elements thus far described, that the end of the band 10 first be drawn through the opening adjacent the end 13 of the ferrule 12, then through the whole ferrule, the end of the ribbon overfolded and stapled with the element 20, following which the end of the band may be retracted to about the position shown within the ferrule, indicating a final position in the assembly. The socket-forming structure 11 may be externally moistened for ease of application and readily inserted by constricting it, then partly inserting, then spiralling same into the ferrule 12 in such relation that the end of the tubing or other stock forming the member 11, bottoms against the overfolded head 15. The slight compression with which the socket is retained in the ferrule, will serve, unless and until it is intentionally removed, to maintain the parts in substantially the relation shown by Fig. 3.

The manner and advantages of usage of the device will have become for the most part apparent from the preceding description, but it may be noted for completeness that application of the retainer consists merely in insertion of the free terminals of the temple elements, or bows as the case may be, into the open ends of the socket elements 11. The assembly 10—11 is of such length that, after application of the retainer to the spectacles, the now closed loop consisting of spectacles and band may be readily brought over the head of the wearer, thence downwardly to a position of repose substantially as shown by Fig. 1, the spectacles resting lightly on the breast or chest areas of the wearer, and the preferably soft material of the band 10, engaging the rear surface of the neck. When it is desired to bring the spectacles to a position of use, they are merely lifted and applied as usual, with the bridge over the nose of the wearer and the temples brought just over, or if bowed, around the rear of the ears. In either case it will appear that the length of the band is such that it will lie loosely, and out of engagement with the neck or head, being supported entirely from the sockets and in no wise interfering with the usual usage or location of the spectacles. A definite advantage obtains with some types of spectacles, depending upon their adjustment, in that the soft, highly resilient material constituting the sockets 11 serves definitely to cushion the extremities of the temples or bows in areas where these extremities might otherwise result in irritation of the skin as is sometimes experienced. It will thus appear that the attachment of the present retainer in no wise alters the facultative movements or manipulation incident to applying or removing the spectacles, and that the length of band is also such that there is no disturbance of hair dress or articles of clothing by reason of use of the retainer, it being equally adapted for wear by men and women, as well as children.

The retainer is readily applied to the ends of the temple bars of conventional spectacles. The freely expansible elastic socket elements 11 will fit over and embrace various sizes and styles of temple bars. The ferrules 12, in addition to furnishing a most desirable attaching means between the band 10 and the socket elements, aid in applying and removing the socket elements from the temple bars by acting as a firm manually holdable portion.

Although the invention has been described by a somewhat detailed reference to a preferred embodiment, the detail of description is to be understood solely in an instructive sense and without limitation, numerous variants being possible within the scope of the claims hereunto appended.

I claim as my invention:

1. A removable spectacle retainer for spectacles having a lens frame and temple bars extending backwardly therefrom to extend over the ears of the wearer and thereby to support the spectacles, the retainer comprising an elongated element of ribbon, two separate socket elements of rubber, and means attaching one end of each socket element to one end of the flexible element with the other end open and projecting outwardly from the flexible element, for resilient expansion and engagement over the ends of the temple bars of the spectacles, said attaching means closing the said one end of each socket element, the retainer having a length substantially greater than the distance from the ears around the back of the human head and sufficient to enable the spectacles to be put into use, taken off freely, and be suspended from the neck of the wearer when taken from the head.

2. A removable spectacle retainer for spectacles having a lens frame and temple bars extending backwardly therefrom to extend over the ears of the wearer and thereby to support the spectacles, the retainer comprising an elongated element of ribbon and chain-like flexibility, two separate socket elements of gum rubber-like elasticity, and means attaching one end of each socket element to one end of the flexible element with the other end open and projecting outwardly from the flexible element, for resilient expansion and engagement over the ends of the temple bars of the spectacles, the retainer having a length substantially greater than the distance from the ears around the back of the human head and sufficient to enable the spectacles to be put into use, taken off freely, and be suspended from the neck of the wearer when taken from the head, the means attaching the socket elements comprising a rigid element firmly attached to each of the socket elements and each rigid element constituting firm, manually engageable means for use in removing the retainer and replacing it on the temple bars.

3. A removable spectacle retainer for spectacles having a lens frame and temple bars extending backwardly therefrom to extend over the ears of the wearer and thereby to support the spectacles, the retainer comprising an elongated element of ribbon and chain-like flexibility, two separate socket elements of gum rubber-like elasticity, and means attaching one end of each socket element to one end of the flexible element with the other end open and projecting outwardly from the flexible element, for resilient expansion and engagement over the ends of the temple bars of the spectacles, the retainer having a length substantially greater than the distance from the ears around the back of the human head and sufficient to enable the spectacles to be put into use, taken off freely, and be suspended from the neck of the wearer when taken from the head, the means attaching each of the socket elements comprising a rigid ferrule embracing the adjacent ends of the flexible elements and the socket elements.

ELEANOR E. PENDLETON.

REFERENCES CITED

The following references are of record in the file of this patent:

UNITED STATES PATENTS

| Number | Name | Date |
|---|---|---|
| 1,026,272 | Leveque | May 14, 1912 |
| 1,819,738 | Daniels | Aug. 18, 1931 |
| 2,023,523 | Gimball | Dec. 10, 1935 |
| 2,249,572 | Lieber | July 15, 1941 |